Fig. 4 (Example 2)
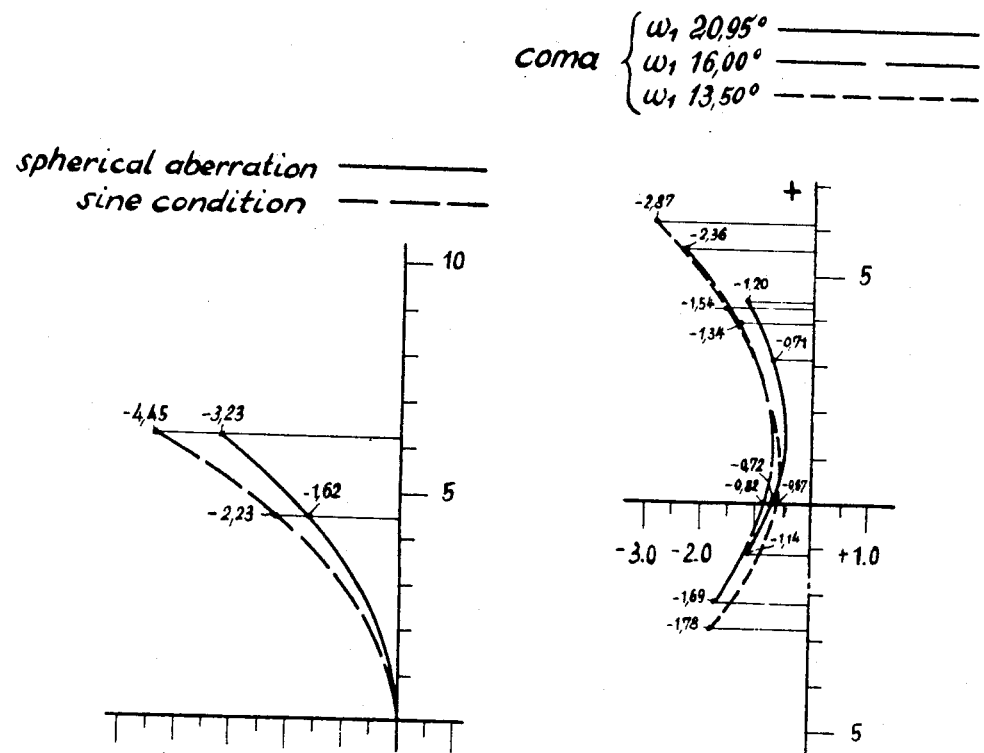
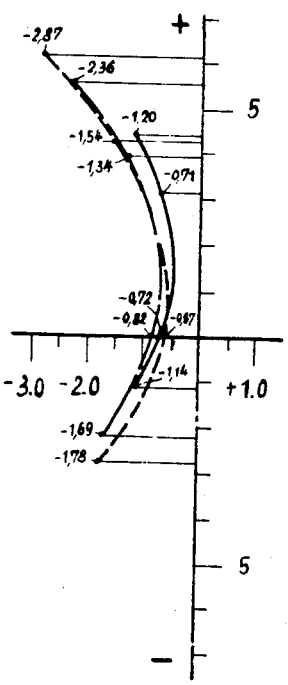
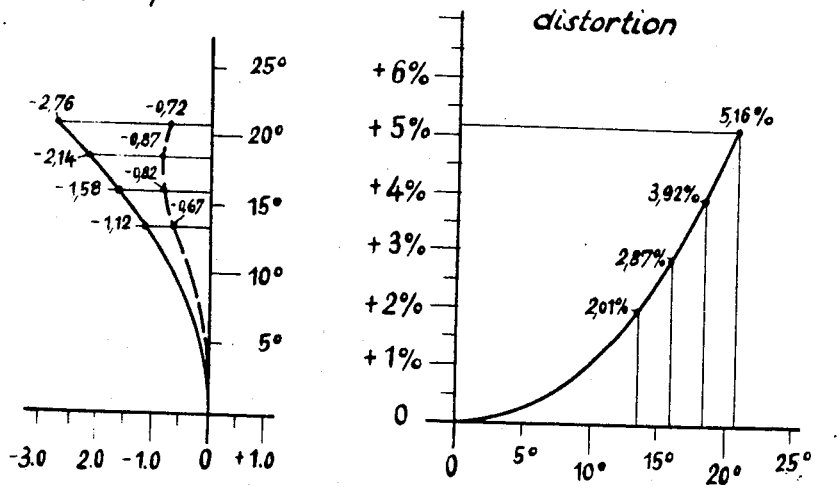

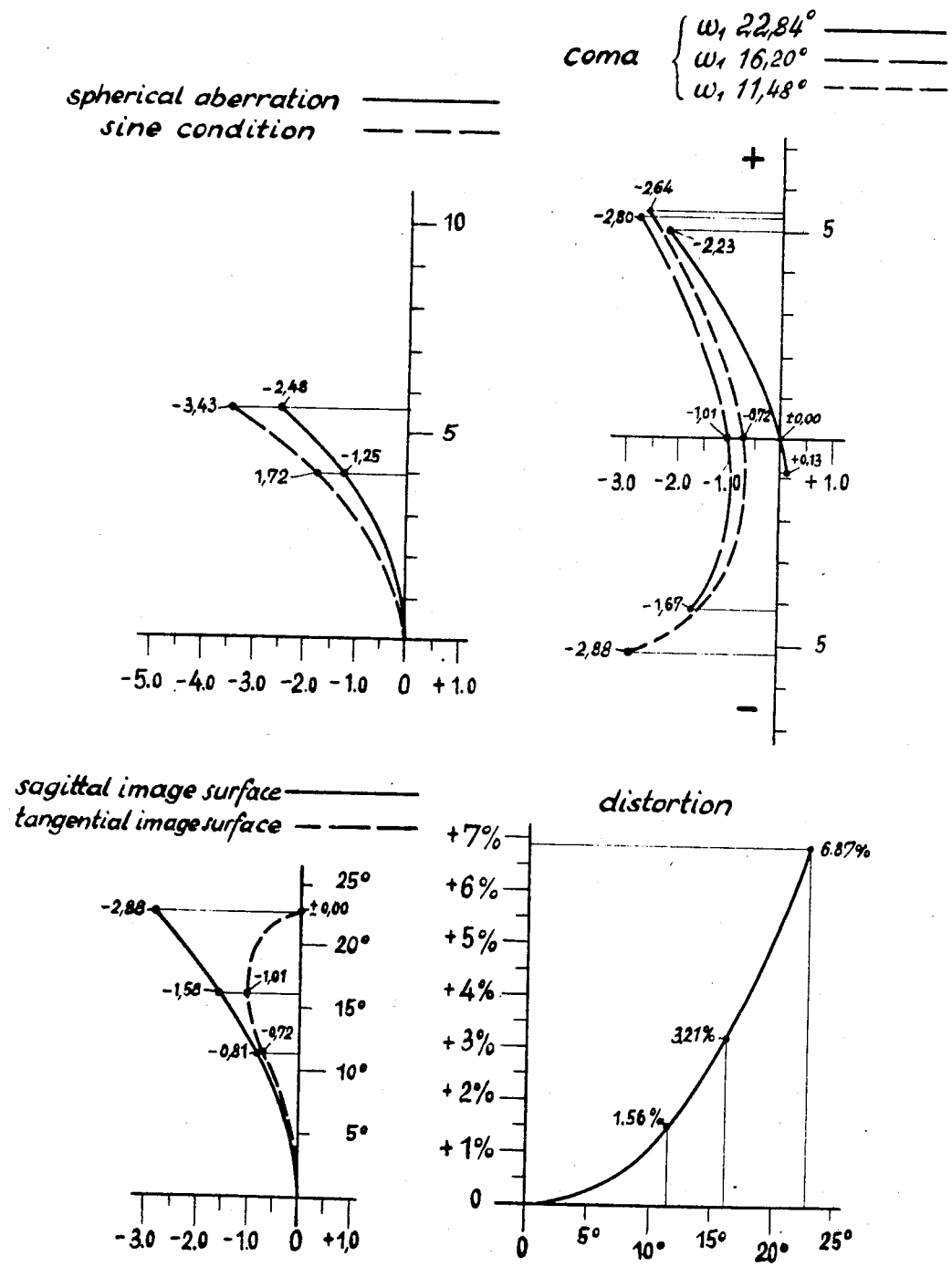

3,511,558
DOUBLET WHICH IS PARTIALLY CORRECTED SPHERICALLY, CHROMATICALLY AND ASTIGMATICALLY
Fritz Uberhagen, Braunschweig, Germany, assignor to Voigtlander, A.G., Braunschweig, Germany, a corporation of Germany
Filed June 7, 1966, Ser. No. 555,758
Claims priority, application Germany, June 24, 1965, V 28,726
Int. Cl. G02b 3/00
U.S. Cl. 350—232
2 Claims

ABSTRACT OF THE DISCLOSURE

A photographic objective having a doublet and a diaphragm located to the rear of the doublet. The doublet is made up of a front biconvex converging lens followed by and located closely adjacent to an inner or rear biconcave diverging lens situated between the converging lens and the diaphragm. For the yellow $d$-line of the helium spectrum, the refractive indexes of the glass for the two lenses is no greater than 0.05. The rear concave surface of the diverging lens has a smaller radius of curvature than the front concave surface thereof, and the ratio between these radii is in a range of 1:0.475 to 1:0.725. The entire doublet has a Gardner shape factor greater than 4.50 but less than 7.50. The sum of the radii of the two inner lens surfaces is greater than 1.65 times but smaller than 3.30 times the sum of the radii of the two outer lens surfaces. As a result of these expedients the imaging error is very greatly reduced.

---

The present invention relates to a two-lens objective (doublet) for photographic purposes, this objective being provided, for the central image portion, on the one hand, as well as also for the outer axial field, on the other hand, with a partial correction of spherical and chromatic deviations, on the one hand, as well as with a reduction of the curvature of the astigmatic image surface, on the other hand.

Telescope objective types of doublets, where the two individual lenses opposed power signs enclose an adjoining pair of strongly dispersive surfaces, have only an essentially sphero-chromatic correction and thus only a relatively small useful viewing field, so that practically only a small central image portion provides a sharp image, while at the side thereof the image sharpness very quickly drops off to a condition of practically no utility. This dropping off of the image sharpness in the outer-axial viewing field is all the more strongly pronounced, the better the quality of the collected image in the central portion of the image with respect to the size of the lateral image error—such as image curvature and astigmatism—for the sharply inclined bundle of light rays as a result of the optical construction.

There are on the other hand also known doublets where a converging pair of adjoining surfaces are enclosed—as approximately at half of the four-lens double anastigmat or half of the simple, uncemented Gauss objective—, and as a result these doublets provide the astigmatic image surface over a relatively good section in the lateral viewing field. However, with these doublets there are extremely large degrees of aberration in the central image portion, which are predominantly tied in with even greater deviations from fulfilling the sine condition, so that this type of two-lens objective has imaging relationships which are the opposite of those of the telescope objective, namely with an increasingly useful peripheral image quality an extremely poor image production in the central image field. This latter type of doublet is therefore also unsuited for the same imaging purposes as the first type of two-lens telescope objective.

The present invention has as its primary object the provision of an imaging not only at the inner-axial but also at the outer-axial image field, which although including certain residual errors, nevertheless is capable of providing imaging with relatively high light intensity where at relative openings of between approximately $f: 6.3$ and $f: 9$, for an image field having an angular extension of up to 45° and more, a fully satisfactory image for normal amateur purposes is achieved.

For this purpose, there is provided in accordance with the invention a new compromise which simultaneously provides not only a spherical but also a chromatic partial correction and thus results in desired imaging in the central image portion, while at the same time there is achievement of an appropriate partial correction of the astigmatic image surface deviations, so that it is possible to provide at the same time also in the outer-axial image portion of the photograph format the basis for realizing the desired image reproduction.

In contrast with older solutions based on compromise in this direction, which were necessarily accompanied in the finite-extended viewing field with extremely large coma errors, there is in accordance with the invention an essential increase in the improvement of the imaging power of such a simple system so that it becomes possible with a finite opening to provide not only an appropriate reduction in the aberrations per se of a coma pencil of rays, but also at the same time to significantly reduce the poor image quality resulting from the asymmetry error portion of the coma errors, while with the older type of compromise solutions, as a result of these large asymmetry error portions, the lateral image points degenerate into very intensive, one-sided coma traces which up to now greatly reduced the useful image as a result of inner coma or outer coma in the meridian section.

This serious image error is, by way of the present invention, to a very large extent reduced in a most surprising way and is capable, for the first time, of being corrected to such an extent that in the course of the coma curve, the residual aberrations for the upper coma rays (upper portion of the coma curve) are practically the same as those of the corresponding lower coma rays (lower coma curve portion), with the result that the lateral dispersive defects are for the most part symmetrical with respect to their own center and therefore the imaging of coma traces is avoided. As a result of this significant reduction of the asymmetry error portion of coma, the partial spherical correction of the objective of the invention will now in the first place act to the full extent to correct in the lateral pencil of rays of a finite opening the coma error portion which is based on the action of the spherical aberration in such lateral pencil rays of a finite opening.

This solution to the problem is achieved with the doublet of the invention with a departure from that standard of construction which is fulfilled in the case of telescope objectives where the glass sequence is no longer representative of the so-called "old-achromat" having a large difference in the refractive indices between a low-refracting glass for the converging lens and a high-refracting glass for the diverging lens, and instead the doublet of the invention utilizes rather two types of glass of average refractive index, whose refractive index difference for the yellow $d$-line of the helium spectrum is no greater than 0.05. Moreover, the diverging lens required to produce the desired partial correction and situated at the side of the shorter conjugate is in the form of a biconcave lens both of whose radii of curvature have opposed sign directions, and where the concave surface which is directed toward the image is made smaller than the other concave surface which is directed toward the object, in such a way that the relationship between the radii of these surfaces is situated between a lower limit of 1:0.475 and an upper limit of 1:0.725. Furthermore, in accordance with the invention, there is arranged on the object side of the thus-formed biconcave diverging lens, a biconvex converging lens which provides together with the diverging lens a doublet having a combined meniscus whose Gardner shape factor $s_{R_1, R_2'}$ is greater than 0.50, without however exceeding an upper limit of 7.50.

As a result of these latter expedients, there is an assurance that on the one hand the extension of the astigmatic image surface into the lateral viewing field is achieved, in accordance with the purpose of the invention and on the other hand the desired lateral partial correction is achieved, without having the improvement of the imaging in the lateral portion of the viewing field approach too closely to the ideal anastigmatic image field flattening, because then the difference in the imaging production between the inner-axial and outer-axial image fields can increase to an undesirable extent. In order to prevent this latter possibility, the upper limiting value of the Gardner shape factor is provided so that the form of the combined doublet as an anastigmatic meniscus is reliably avoided, the Gardner shape factor $s$ increasing to infinity in the latter case, as is known. The above measurement requirements moreover provide an extensive reduction in the asymmetry error portion in the lateral coma course. For a particularly effective reduction of the spherical error portion in the lateral ray course, an additional expedient of the invention is provided. For this purpose there is in correspondence with the further characteristics of the inner pair of adjoining surfaces ($R_1'$ and $R_2$) dimensions of these surfaces which provide a sum of their radii ($R_1'+R_2$) having absolute values greater than 1.65 times the sum of the radii ($R_1+R_2'$) of the two concave exterior radii opposed to the shorter conjugate ($R_1$ and $R_2'$) of the meniscus shaped entire doublet, without however exceeding with the first value 3.30 times the latter radii sum.

This last expedient results in a further technical simplification, namely the realization of the possibility of uniting a simply constructed lens installation into a single unitary element, by uniting both lenses in a known way with each other with cement. In general such a constructive simplification would be accompanied by a poorer imaging capability, since the introduction of such cement on a pair of construction elements which are introduced into the assembly should be avoided. According to investigations carried out in connection with the present invention, however, it has been demonstrated that especially by the use of this latter feature this simplification can be fully used without resulting in any significant reduction in the desired quality of the image.

In order to provide a sufficient chromatic partial correction, it is sufficient with the objective of the invention, in general, to situate in front of a biconcave diverging lens made of flint glass a biconvex converging lens made of a conventional crown glass of average weight. There is thus available to the optical designer a range in the difference of $\nu$-value which is situated approximately between 14 and 28 and thus in a known way is adequate for providing a sufficient chromatic correction.

The invention is illustrated by way of example in the accompanying drawings which form part of this application and in which.

Figure 1:
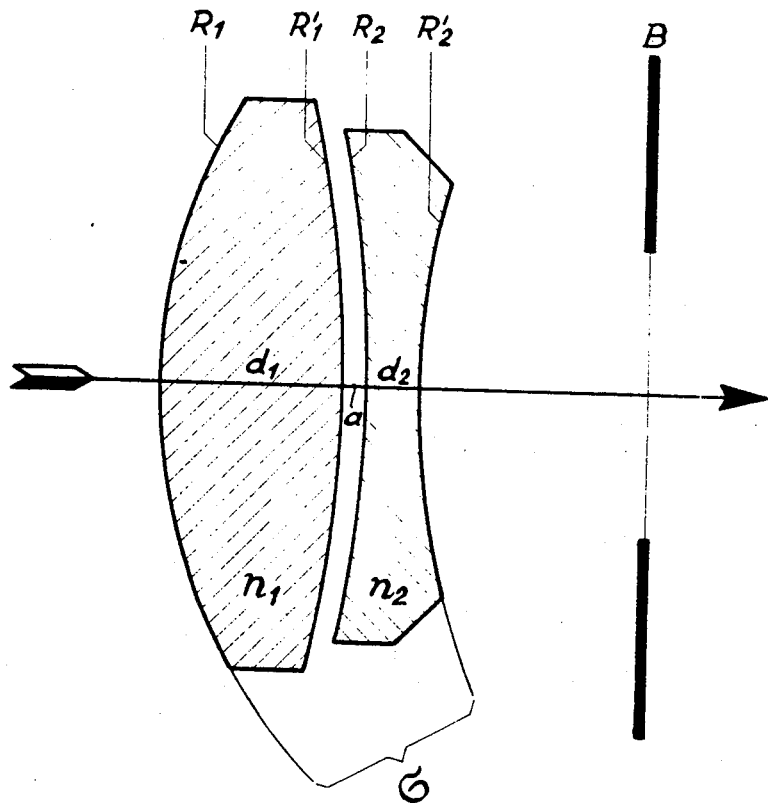
FIG. 1 shows one embodiment of the objective of the invention.

FIGS. 3 and 4 are graphs showing curves which illustrate the corrections achieved for the examples of FIGS. 1 and 2, respectively; and In FIG. 1 the objective of the invention is shown together with a diaphragm B situated in the direction of the shorter conjugate, and in FIG. 1 the reference characters correspond to those used in the numerical table below. In FIG. 1 the reference character R designates the radii of curvature, the reference character $d$ the lens thickness along the optical axis, and the reference character $n$ the refractive indices of the glass of the lenses, the numerical designations increasing from the side of the longer conjugate to the side of the shorter conjugate. The distance between the inner pair of lens surfaces is designated $a$ and the Gardner shape factor $s$ is schematically shown in the drawing. In the numerical tables the different glasses are characterized by the refractive indices and the Abbé numbers ($\nu$) with respect to their color dispersion, and at the same time the refractive index $n$ of the glass refractive index is given for the yellow $d$-line of the helium spectrum.

In the numerical tables below there are also provided the equivalent focal length $f$, as well as the distance from the back lens to the image $s'$, at the image side, for a distant object, and also the distance $b$ from the axial base point of the diaphragm to the adjoining last apex of the adjoining lens surface, and in addition the relative opening of the objective. The surface refractive power $\varphi$ of the individual lens surfaces is also indicated in the numerical tables.

Figure 2:
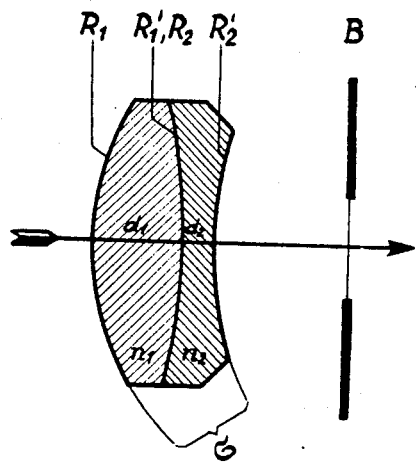
FIG. 2 shows another embodiment of the objective.

FIG. 2 shows an embodiment of the objective of the invention for a focal length of $f=200$ mm., in a size more closely approaching the actual size, where the inner adjoining pair of surfaces are united by cement so as to form a cemented pair of surfaces.

As was indicated above, FIGS. 3 and 4 show the correction conditions for the two embodiments.

NUMERICAL EXAMPLE 1

[$f=100.0$; $s'=82.389$; 1:8.8; image angle 46°]

| | | | | |
|---|---|---|---|---|
| $R_1=+23.746$ | $d_1=9.500$ | $n_1=1.58913$ | $\nu_1=61.24$ | $\varphi_1=+2.480965$ |
| $R_1'=-56.182$ | $a=0.120$ | | | $\varphi_1'=+1.048610$ |
| $R_2=-52.593$ | $d_2=1.500$ | $n_2=1.56443$ | $\nu_2=43.75$ | $\varphi_2=-1.073204$ |
| $R_2'=+31.764$ | | | | $\varphi_2'+-1.776949$ |

Diaphragm distance $b=11.0$ mm. behind $R_2'$.

Thus, in this case:

$$n_1-n_2=0.02470$$

therefore smaller than 0.050.

$$|R_2:R_2'|=52,593:31.764=1:0.6039$$

situated therefore between the limit values 1:0.475 and 1:0.725, absolutely calculated.

$$sR_1'R_2'=\frac{R_2'+R_1}{R_2'-R_1}=6.9232$$

situated therefore between the limit values 4.50 and 7.50.

Furthermore, the radii sums $$R_1+R_2'=55.510$$

as well as $$|R_1'+R_2|=108.775$$

and the latter is 1.9596 times 55.510 and is thus greater than 1.65 times, but smaller than 3.30 times 55.510.

NUMERICAL EXAMPLE 2

[$f$=100.0; $s'$=83.71; 1:7.7; image angle 42°]

| | | | | |
|---|---|---|---|---|
| $R_1$=+23.92330 | $d_1$=8.01152 | | $n_1$=1.60738 | $\nu_1$=56.66 | $\varphi_1$=+2.53886 |
| $R_1'$=−56.94858 | | | | | $\varphi_1$=+1.06654 |
| $R_2$=−56.94848 | $a$=0 cemented | | | | $\varphi_2$=−1.08877 |
| $R_2'$=+34.16025 | $d_2$=2.33669 | | $n_2$=1.62004 | $\nu_2$=36.34 | $\varphi_2$=−1.81509 |

Diaphragm distance $b$=12.24 behind $R_2'$.
Thus, in this case:

$$n_2 - n_1 = 0.01266$$

therefore smaller than 0.050.

$$|R_2:R_2'| = 56.94858:34.16025 = 1:0.59984$$

situated therefore between the limit values 1:0.475 and 1:0.725, absolutely calculated.

$$s_{R_1,R_2'} = 5.6739$$

situated therefore between the limit values 4.50 and 7.50.
Furthermore, the radii sums $$R_1 + R_2' = 58.08355$$

as well as $$|R_1' + R_2| = 113.89716$$

and the latter is 1.9609 times 58.08355 and is thus greater than 1.65 times, but smaller than 3.30 times 58.08355.

What is claimed is:

1. A doublet partially corrected spherically, chromatically and with respect to deviations of the astigmatic image surface, comprising a biconvex converging lens and, situated on the shorter conjugate side thereof, a following biconcave diverging lens, where
   (a) the radius of curvature of the concave surface of the diverging lens at the image side thereof is more sharply curved than the front radius of curvature thereof on the object side, with the ratio between the said radii of curvature, namely the fraction resulting from dividing the front radius of curvature of said diverging lens by the rear radius of curvature thereof, being between limiting values of 1:0.475 and 1:0.725, absolutely calculated,
   (b) the difference between the refractive index for the yellow $d$-line of the helium spectrum of said diverging lens with respect to the corresponding refractive index of the converging lens situated forwardly thereof being no greater than 0.05,
   (c) the pair of outer doublet surfaces forming with respect to the side of the shorter conjugate a concave combined meniscus whose Gardner shape factor $s$ is greater than 4.50 but does not exceed 7.50,
   (d) the sum of the radii of the two inner lens surfaces which are directed toward each other with respect to their absolute values is larger than 1.65 times, but remains smaller than 3.30 times the sum of the radii of the two outer lens surfaces both of which are concave with respect to the shorter conjugate for the combined doublet, and
   (e) the radii of curvature (R), the lens thickness ($d$) and air gap ($a$), the refractive index ($n$) and the Abbé number ($\nu$) being as follows with the subscripts 1 and 2 respectively referring to the biconvex converging lens and biconcave diverging lens, whereby the following data are realized:

| | | | |
|---|---|---|---|
| $R_1$ = +0.24$f$ | $d_1$=0.095$f$ | $n_1$=1.589 | $\nu^1$=61.2 |
| $R_1'$ = −0.56$f$ | $a$=0.0012$f$ | | |
| $R_2$ = −0.53$f$ | $d_2$=0.15$f$ | $n_2$=1.564 | $\nu^2$=43.8 |
| $R_2'$ = +0.32$f$ | | | | where $f$ denotes the equivalent focal length, $n$ the refractive indices for the $d$-line of the helium spectrum and $\gamma$ the Abbé number for the color dispersion.

2. A doublet partially corrected spherically, chromatically and with respect to deviations of the astigmatic image surface, comprising a biconvex converging lens and, situated on the shorter conjugate side thereof, a following biconcave diverging lens, where
   (a) the radius of curvature of the concave surface of the diverging lens at the image side thereof is more sharply curved than the front radius of curvature thereof on the object side, with the ratio between the said radii of curvature, namely the fraction resulting from dividing the front radius of curvature of said diverging lens by the rear radius of curvature thereof, being between limiting values of 1:0.475 and 1:0.725, absolutely calculated,
   (b) the difference between the refractive index for the yellow $d$-line of the helium spectrum of said diverging lens with respect to the corresponding refractive index of the converging lens situated forwardly thereof being no greater than 0.05,
   (c) the pair of outer doublet surfaces forming with respect to the side of the shorter conjugate a concave combined miniscus whose Gardner shape factor $s$ is greater than 4.50 but does not exceed 7.50, and
   (d) the sum of the radii of the two inner lens surfaces which are directed toward each other with respect to their absolute values is larger than 1.65 times, but remains smaller than 3.30 times the sum of the radii of the two outer lens surfaces both of which are concave with respect to the shorter conjugate for the combined doublet,
   (e) the length of the curvature radii (R), the lens thickness ($d$), the refractive index ($n$) and the Abbé number ($\nu$), are as follows with the subscripts 1 and 2 respectively referring to the biconvex converging lens and biconcave diverging lens, whereby the following data are realized:

| | | | |
|---|---|---|---|
| $R_1$=+0.24$f$ | $d_1$=0.08$f$ | $n$=1.607 | $\nu^1$=57 |
| $R_1'$=−0.57$f$ | $a$=0 | | |
| $R_2$=−0.57$f$ | $d_2$=0.023$f$ | $n_2$=1.620 | $\nu^2$=36 |
| $R_2'$=+0.34$f$ | | | | wherein $f$ denotes the equivalent focal length, $n$ the refractive indices for the $d$-line of the helium spectrum and $\gamma$ the Abbé number for the color dispersion.

References Cited

UNITED STATES PATENTS 1,197,742   9/1916   Kellner _____ 350—232
1,643,865   9/1927   Weidert _____ 350—232
2,421,927   6/1947   Cox _____ 350—232

DAVID SCHONBERG, Primary Examiner

R. J. STERN, Assistant Examiner

U.S. Cl. X.R.

350—206, 233